Inventor.
Sigmund N. Porter

By: Louis A Kline
John J. Matlago
Nathan Cass
His Attorneys.

Inventor.
Sigmund N. Porter

By: Louis A Kline
John J. Matlago
Nathan Cass
His Attorneys.

Inventor.
Sigmund N. Porter

By: Louis A. Kline
John J. Matlago
Nathan Cass
His Attorneys.

Nov. 7, 1967 S. N. PORTER 3,351,774

SUPERCONDUCTING CIRCUITS CONSTRUCTIONS EMPLOYING LOGICALLY RELATED INDUCTIVELY COUPLED PATHS TO REDUCE EFFECTIVE MAGNETIC SWITCHING INDUCTANCE

Filed Oct. 9, 1963 7 Sheets-Sheet 4

Inventor.
Sigmund N. Porter

By: Louis A Kline
John J. Matlago
Nathan Cass
His Attorneys.

Inventor.
Sigmund N. Porter

By: Louis A. Kline
John J. Matlago
Nathan Cass
His Attorneys.

Inventor.
Sigmund N. Porter

By: Louis A. Kline
John T. Matlago
Nathan Cass
His Attorneys.

Nov. 7, 1967 S. N. PORTER 3,351,774

SUPERCONDUCTING CIRCUITS CONSTRUCTIONS EMPLOYING LOGICALLY RELATED INDUCTIVELY COUPLED PATHS TO REDUCE EFFECTIVE MAGNETIC SWITCHING INDUCTANCE

Filed Oct. 9, 1963

7 Sheets-Sheet 7

Inventor.
Sigmund N. Porter

By: Louis A Kline
John J. Matlago
Nathan Cass
His Attorneys.

United States Patent Office 3,351,774

Patented Nov. 7, 1967

3,351,774

SUPERCONDUCTING CIRCUIT CONSTRUCTIONS EMPLOYING LOGICALLY RELATED INDUCTIVELY COUPLED PATHS TO REDUCE EFFECTIVE MAGNETIC SWITCHING INDUCTANCE

Sigmund N. Porter, Los Angeles, Calif., assignor to The National Cash Register Company, Dayton, Ohio, a corporation of Maryland Filed Oct. 9, 1963, Ser. No. 314,949
27 Claims. (Cl. 307—88.5)

ABSTRACT OF THE DISCLOSURE

A superconductive circuit construction for super-conductive paths and cryotron structures incorporated therein in which the logical and constructional organization is chosen such that paths representing complementary binary propositions are grouped in inductively coupled pairs disposed one over the other, whereby the effective switching inductance thereof is minimized so as to permit a significant increase in operating speed.

This invention relates generally to superconductive circuit elements, and more particularly to improved means and methods for their construction, interconnection, and operation.

It is well known that the electrical resistance of certain materials (such as, for example, mercury, niobium, lead, vanadium, tantalum, tin, aluminum, and titanium) exhibits an abrupt change from a finite resistance to zero resistance when subjected to temperatures very close to absolute zero (0/° Kelvin). This phenomenon is known as superconductivity and the specific temperature at which the electrical resistance of a material abruptly drops to zero (that is, the temperature at which the material becomes superconductive) is commonly referred to as the transition temperature for that material.

From the viewpoint of electrical circuit applications, one of the most important properties of a superconductor is that the normal resistance of the material can be restored by the application of a large enough magnetic field commonly referred to as the critical field, the magnitude of which is a function of temperature. It is thus possible to switch a superconductor from the superconductive state (in which it has zero electrical resistance) to a normal resistive state (in which it has some finite resistance) merely by the application of the appropriate critical magnetic field required for the specific superconductive temperature at which the material resides; conversely, if the magnetic field is removed, the material will return to its superconductive state.

Such properties of superconductors as briefly summarized above are well known in the art and the variation of transition temperature with applied magnetic field has been carefully studied for a number of materials, such as those previously mentioned herein. Also, various logical and memory electrical circuit devices have been devised based on superconductive principles. Today, the best known superconductive electrical circuit device is a superconductive gate known as a "cryotron" which depends for its operation on the destruction of superconductivity by an applied magnetic field. In its simplest form a cryotron typically comprises two elements operating at superconductive temperatures, a gate element having a relatively low critical field (such as tin), and a control element having a relatively high critical field (such as lead). The control element is suitably coupled to the gate element so that, when current of an appropriate value is caused to flow in the control element, a magnetic field of at least critical value will be applied to the gate element to switch the gate element to its resistive state, thereby achieving a gating action with respect to current flowing in the gate element. The temperature is maintained below the critical field of the gate element and the control element is made of a material having a sufficiently high critical field relative to the critical field of the gate element so as to prevent the control element from becoming resistive during operation of the cryotron. Also, the effect of current flowing in the gate element is taken into account in providing the desired gating operation.

Early cryotrons were comprised of a piece of wire serving as the gate element encircled by a single layer coil of insulated wire serving as the control element. By passing a suitable current through the coil, the gate wire could be switched from the superconducting state to the resistive state. Such cryotrons were interconnected in various ways to form logical circuits and the like, as is described, for example, in the article "The Cryotron," by D. A. Buck, Proc. IRE., vol. No. 44, April 1956, pages 483 to 493. While such early cryotrons demonstrated the basic capabilities of cryotrons for use in electrical switching circuitry, the resulting circuitry had the disadvantage of a relatively high inductance per unit length which severely limited the possible operating speed, and thereby prevented the use of such cryotron circuitry in applications where high speed operation is an important factor, such as is the case in digital computers.

One of the first significant advances towards increasing the speed of operation of superconductive circuitry was made possible by the use of deposited thin films instead of wires for the gate and control elements of each cryotron as well as for the interconnecting circuitry. By the use of such thin films, the inductance of the cryotron elements could be considerably reduced while the resistance of the cryotron gate element in the non-superconducting state could be made considerably higher, the two effects making possible a significant reduction in the time constants of cryotron circuitry.

A further significant advance which considerably improve the operating speed of superconductive circuitry came about as a result of the introduction of the superconducting ground plane. Typically, in superconductive circuitry employing a superconducting ground plane, a thin film of superconductive material is deposited on a suitable substrate (such as glass or quartz) and serves as the base plane onto which all subsequent portions of the superconductive circuitry are deposited, suitable insulation between layers being provided as necessary. It has been found that such a ground plane, which remains superconducting during circuit operation, serves to considerably reduce the inductance per unit length of the resultant circuitry, while also serving to provide excellent shielding between adjacent circuit portions as well as from external fields.

Although the speed of operation of superconductive circuitry has been improved considerably by the use of thin films and a superconducting ground plane, as described above, the speed of operation of presently known superconductive circuitry is still not considered fast enough for many potential applications, and the search continues for new means and methods for achieving further increases in the operating speed of cryotron circuitry.

Accordingly, a primary object of the present invention is to provide improved means and methods for constructing, interconnecting, and operating superconductive circuitry so as to further extend the speed capabilities thereof.

Another object of the invention is to provide improved constructions for superconductive circuitry which will reduce the seriousness of flaws in construction and make possible the use of relatively simple redundancy techniques.

A further object of the invention is to provide improved cryotron constructions.

Briefly, the above objects are achieved in accordance with the present invention by the employment of a novel design construction for predetermined logically related portions of a superconductive circuit so that the logical relationship and the constructional relationship cooperate to extend the speed capabilties of the circuit. More specifically, the primary feature of the present invention resides in the employment of a logical and constructional arrangement in which parallel paths having a constant current sum are inductively coupled together so that the change in magnetic field occurring during switching is minimized, thereby reducing both the time and energy required for switching.

The specific nature of the invention as well as other objects, advantages, and uses thereof will become apparent from the following description and the accompanying drawings in which.

*Introduction*

Figures 1, 2:
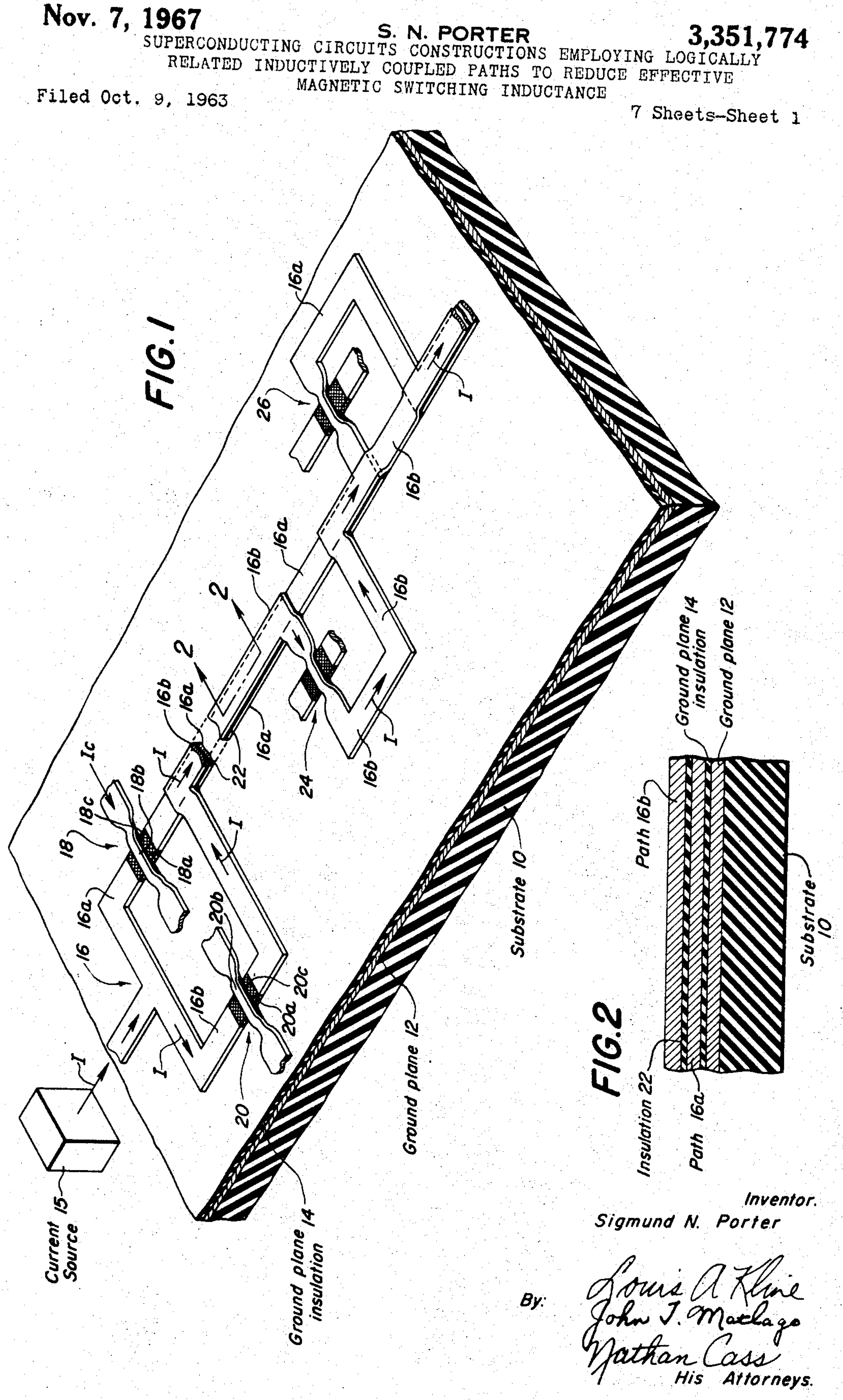
FIG. 1 is a pictorial view, with some portions shown schematically, of a fragmentary portion of a superconductive circuit in which a coupled pair is employed in accordance with the invention for the purpose of reducing the switching time between a pair of long lines having complementary currents constituting a binary logical proposition and its complement.
FIG. 2 is a cross-sectional view taken along the line 2—2 in FIG. 1.
Figure 3:
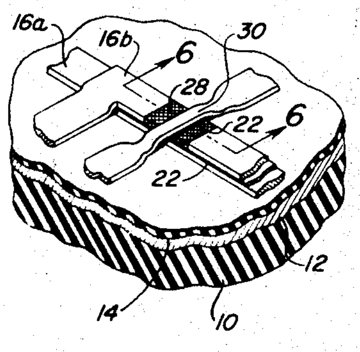
FIGS. 3–5 are pictorial views respectively illustrating three types of structures for incorporating a crossed-film cryotron into the coupled pair construction of the present invention.

It is common practice in superconductive circuitry employed in a binary logical system to represent a binary logical proposition by a path, the logical proposition being true when current is flowing in the path and false when current is absent. It is also common practice in superconductive circuitry to provide the complement of a binary logical proposition by a second path representing a second binary proposition and having complementary current conditions, in which case the states of the two complementary binary propositions will be opposite. It will be understood that by appropriate placement of cryotron elements in predetermined ones of these paths and by the use of appropriate interconnection circuitry therebetween, a binary logical system can be conveniently built up to perform the usual logical operations performable by diode and/or transistor circuitry. Normally, in constructing such superconductive circuitry, advantage is taken of the use of thin films and a superconducting ground plane to increase operating speeds.

In accordance with the principles of the present invention, a further step is taken to increase speed by combining the logical and structural arrangement so that the two cooperate to significantly increase the speed of operation over that which would otherwise be obtainable. The key to the particular logical and structural combination of the present invention is to be found in the realization that, when current is switched between a plurality of parallel paths having a current sum which remains constant, the effective inductance during switching—and thus the switching time as well as the energy required for switching—can be significantly reduced by increasing the magnetic coupling (that is, the mutual inductance) therebetween. Or stated another way, and considering just two paths between which current is switched for the sake of simplicity, if these two paths are placed very close together so that the inductive coupling therebetween is high, the effective inductance between the two paths will be small and relatively little change in magnetic field will occur when current is switched therebetween. As a result, the switching time constant will be small and very little energy will be required for switching. This reduction in energy not only reduces the system power requirements, but also permits a higher maximum repetition rate, since the repetition rate is normally limited by thermal considerations.

As pointed out previously, the use of paths to represent binary logical propositions and their complements is common in superconductive circuitry. Consequently, superconductive circuitry is well suited to permit full advantage to be taken of the present invention, and this is accomplished by inductively coupling predetermined superconductive paths into appropriate groups such that the sum of currents in each group remains constant, whereby, in accordance with the principles of the present invention, the time and energy required for switching will be significantly reduced.

Before taking up various specific constructional embodiments illustrating the invention, it will be instructive at this point in the description to specifically define the meaning of the phrase "parallel paths" as has been and will be used herein to refer to the circuit relationship between a group of paths which are inductively coupled together in accordance with the present invention. The term "parallel paths" as used herein is intended not only in the conventional sense to refer to a group of paths which are electrically in parallel with respect to a power source, but also, is intended in a broader sense to include the situation where no part of the particular current flowing in any one path flows into any other path. In other words, the phrase "parallel paths" is intended to be broad enough to permit inclusion of any group of paths in which no serial arrangement exists with respect to any of the paths. For example, in Patent No. 3,059,196, issued Oct. 16, 1962, it will be noted that certain paths are inductively coupled by placing them close together in a manner similar to various constructions to be described herein. However, it is important to note that these inductively coupled paths are not "parallel" in the sense defined above since the paths in the patent are connected in series—that is, current flowing in one path flows into the other path. Conceptually, an important difference also exists, since when paths are "parallel" in the sense used herein, it is possible to obtain full logical control over the current flow therein so as to achieve the desired cooperation between construction and logic which is essential to the present invention. However, when paths have a serial relationship as in the aforementioned patent, such complete logical control is not possible since current can flow from one path to another path as a result of the serial arrangement therebetween regardless of the logical arrangement.

*The basic coupled pair (FIGS. 1 and 2)*

For purposes of illustration herein, the invention will primarily be demonstrated as applied to the basic situation where just two parallel paths representing a binary proposition and its complement are inductively coupled together, and such a pair of paths will hereinafter be referred to as a "coupled pair." However, it is to be understood that the principles of the present invention can also be applied to three or as many more parallel paths as may be desired for particular applications, the important requirement being that the sum of the currents in each group of inductively coupled parallel paths remain constant.

It is further to be understood that the principles of the present invention may be applied to all or any part of a superconductive circuit, and may be employed separately, or with either or both crossed-film and in-line cryotron elements.

Referring first to FIG. 1, a fragmentary portion of a superconductive circuit is illustrated in which the present invention is advantageously applied for the purpose of reducing the energy and switching time between a pair of relatively long parallel paths constituting a pair of complementary binary logical propositions. By way of example, it will be assumed in FIG. 1 (as well as in all other figures) that the portions of the superconductive circuit which are to remain continuously superconducting (such as the cryotron control elements and the interconnecting paths) are fabricated of lead, while the controllable portions (such as the cryotron gate elements) which are capable of being magnetically switched back and forth between superconducting and resistive states are fabricated of tin. Also, although not shown in the drawings, means are provided for maintaining the temperature of the illustrative circuits at the sufficiently low temperature required for proper operation thereof.

Now considering FIG. 1 in detail, it will be seen that an insulative substrate 10 serves as a support member for the superconductive circuitry. A layer 12 of lead is deposited on the substrate 10 to act as a superconducting ground plane and is followed by an insulating layer 14 (such as silicon monoxide) which provides insulation between the ground plane 12 and the superconductive circuitry which is next deposited thereon, all of this deposition being accomplished by techniques well known in the art (such as evaporation). The superconductive circuitry is fabricated in the form of strips of lead and tin, the lead remaining continuously superconducting and the tin (indicated by double cross-hatching) being controllably switchable between superconducting and resistive states.

A current source 15 in FIG. 1 illustrates a suitable means for providing a current I which is fed to a typical type of cryotron-controlled two-path circuit 16 having strips or paths **16*a* and 16*b*. Each of paths 16*a* and 16*b* has a conventional type of crossed-film cryotron provided therein indicated at 18 and 20, respectively. Each cryotron comprises a controllable tin gate element (18*a* for cryotron 18 and 20*a* for cryotron 20) which is orthogonally crossed by a lead control element (18*b* for cryotron 18 and 20*b* for cryotron 20) and is electrically insulated therefrom by a suitable dielectric film (18*c* for cryotron 18 and 20*c* for cryotron 20), such as silicon monoxide. For the sake of greater clarity, the insulation provided between circuit elements in FIG. 1 (such as 18*c* and 20*c*) is shown as being solid black, and this representation will be followed in all other figures of this type. Also, it will be noted that the crossed-film cryotron control elements 18*b* and 20*b* are of reduced cross-section relative to their respective gate elements 18*a* and 20*a***, as is conventionally done to achieve current gain.

For purposes of illustration it will be assumed that the circuitry to which the control elements **18*b* and 20*b* are connected is such that control current $I_c$ is always applied to not more than one of the cryotron control elements 18*b* and 20*b*. As a result, only one gate element 18$b$ or 20$a$ will be resistive at a time and the input current I will flow in only one of the strips or paths 16$a$ or 16$b$. Paths 16$a$ and 16$b$ may thus be considered to represent a complementary pair of binary logical propositions. FIG. 1 illustrates the case where current is flowing in path 16$b$ as a result of control current $I_c$ having been last applied to control element 18$b$ of cryotron 18 which made gate element 18$a$ resistive, and thereby caused the input current I to flow into path 16$b$. It will be understood that current will remain flowing in path 16$b$ until gate element 20$a$ of cryotron 20 is made resistive by applying a control current to control element 20$b$. Since current is thus presently flowing in path 16$b$ in FIG. 1, the binary proposition represented thereby may be considered as being true, while the complementary binary proposition represented by path 16**$a$ may be considered false.

So far, the description has concerned the portions of FIG. 1 which are conventional. If conventional practice were continued to be followed, paths 16$a$ and 16$b$ would merely be fed along appropriate paths to other portions of the superconductive circuitry where the propositions represented thereby are required without any attempt to couple the paths magnetically. However, in accordance with the present invention, the logically related paths 16$a$ and 16$b$ in FIG. 1 are advantageously constructed and arranged so as to maximize the mutual inductance therebetween for the purpose of significantly reducing the switching time and energy which would otherwise be required. This is accomplished, as illustrated in FIG. 1, by structurally combining the two paths 16$a$ and 16$b$ by depositing one over the other and separated by a thin film of electrical insulation 22. As mentioned previously, such a magnetically coupled arrangement of paths representing a complementary pair of binary logical propositions will be referred to as a coupled pair.

It will be appreciated from the discussion so far that since paths in a superconductive circuit may have to extend over considerable lengths in order to reach all the portions of the circuit where the propositions represented thereby are required, the forming of a coupled pair of these two paths as illustrated in FIG. 1 can significantly reduce the effective inductance of the paths, thereby significantly reducing the energy required for switching as well as the switching time of currents between paths. Furthermore, since the paths of a coupled pair are logically related, shorts occurring because of defects in the insulation provided therebetween will also be logically related, so that relatively simple redundancy techniques can be used to compensate for these defects.

FIG. 1 also illustrates how each path of a coupled pair may be temporarily decoupled (that is, separated in a physical sense) from the coupled pair construction in order to control other cryotrons. For example, FIG. 1 shows how path 16$a$ may be temporarily decoupled to serve as a control element for a crossed-film cryotron 26, and how path 16$b$ may be temporarily decoupled to serve as a control element for a crossed-film cryotron 24. Other possible arrangements will, of course, be apparent to those skilled in the art, the arrangement in FIG. 1 being merely illustrative.

FIG. 2 is a cross-sectional view taken along the line 2—2 in FIG. 1 illustrating the cross section of the coupled pair formed of paths 16$a$ and 16$b$. It will be seen that path 16$b$ is suitably deposited over path 16$a$ and electrically insulated therefrom by a layer of insulation 22. As shown in FIG. 2, the thus formed coupled pair is suitably deposited over the conventional superconducting ground plane 12 and electrically insulated therefrom by the ground plane insulation 14, the substrate 10 serving as a support member.

While the present invention can be used to considerable advantage by providing coupled pairs merely for the purpose of transmitting signals between different places in a superconductive circuit, as illustrated in FIG. 1, even further advantages can be gained by incorporating cryotrons directly into the coupled pair construction. The manner in which this incorporation can be accomplished is illustrated in FIGS. 3–49 for a number of preferred embodiments.

*Incorporation of a crossed-film cryotron in the coupled-pair construction (FIGS. 3–12)*

Considering FIGS. 3–11 first, these figures illustrate how cryotrons of the crossed-film type (such as illustrated by cryotrons 18 and 20 in FIG. 1) can be incorporated into a coupled pair construction in three different ways. The manner in which threse three cryotron-incorporated constructions are represented in FIGS. 3–11 is as follows. Each type of construction is first shown pictorially in a figure similar to FIG. 1, these being FIGS. 3–5. Next, an appropriate cross-sectional view (similar to FIG. 2) is shown below each of the pictorial views 3–5, these cross-sectional figures being FIGS. 6–8, respectively. The thicknesses of the layers in the cross-sectional views 6–8 are considerably exaggerated for greater clarity. Finally, below each of these cross-sectional views (FIGS. 6–8), a schematic diagram is provided to conveniently represent the arrangement of each resultant structure, these being FIGS. 9–11, respectively.

It is also to be noted with respect to FIGS. 3–11 that a numbering system is employed which is in correspondence with FIGS. 1 and 2—that is, the substrate is indicated by the numeral 10, the superconducting ground plane by the numeral 12, the ground plane insulation by the numeral 14, the paths forming the coupled pair by the designations 16$a$ and 16$b$, and the insulation provided between the coupled pair and other elements of the structure by the numeral 22. Also, since each of the three types of constructions illustrated in FIGS. 3–11 includes a crossed-film cryotron, additional numbering is employed as follows. The numeral 28 is used to designate the tin gate element of the cryotron and the numeral 30 is used to designate the reduced-width lead control element of the cryotron, it being understood that current through the cryotron control element 30 controls whether or not the tin gate element is superconducting.

Figure 9:
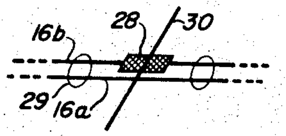
FIGS. 9–11 are schematic diagrams representing the structures illustrated in FIGS. 3–5, respectively.
Figure 10:
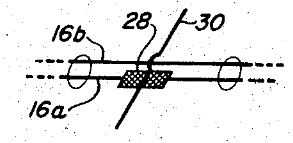
Figure 11:
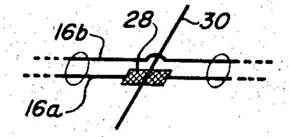

The schematic diagrams of FIGS. 9–11 have been included as an aid in understanding the construction and operation of the respective structures to which they correspond. It will be seen in these schematic diagrams of FIGS. 9–11 that paths 16$a$ and 16$b$ and cryotron control elements 30 are represented merely as lines, while cryotron gate elements 28 are represented as parallelograms. Also, for greater clarity in FIGS. 9–11 the substrate, the ground plane and the intervening insulation between elements or paths have been omitted, and the vertical spacing between elements has been exaggerated. In addition, to conveniently designate a coupled pair in these schematic diagrams of FIGS. 9–11, an elliptical ring is provided therearound, such as typically shown at 29 in FIG. 9. It is further to be understood with respect to these schematic diagrams of FIGS. 9–11 that the spacing in the vertical direction between lines and/or elements represents the order in which the various lines and/or controllable tin elements are deposited one over the other in forming the resultant overlapping structure. For example, in FIG. 9, path 16$a$ is on the bottom, path 16$b$ containing the cryotron gate element 28 is next, and the control line 30 is on the top.

Figure 4:
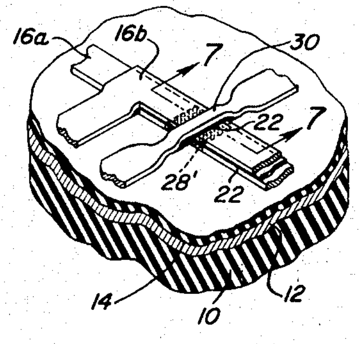
Figure 5:
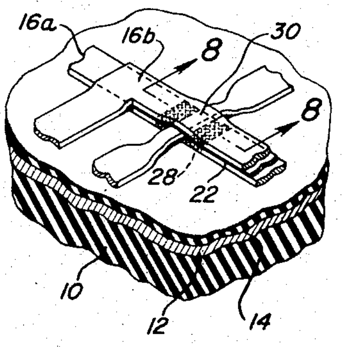
Figure 6:
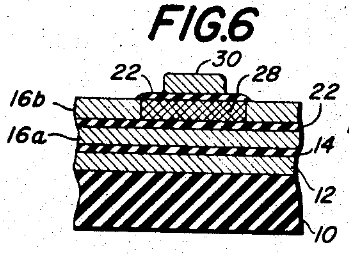
FIGS. 6–8 are cross-sectional views taken along the lines 6—6, 7—7 and 8—8 in FIGS. 3–5, respectively.
Figure 7:
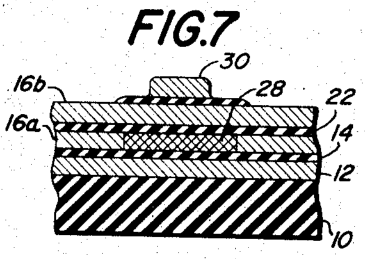
Figure 8:
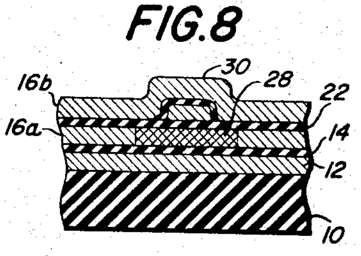

Wtih the above explanation of FIGS. 3–11 in view, the three types of overlapping crossed-film cryotron constructions shown therein will now be considered in more detail. In the construction shown in FIG. 3 it will be seen that the coupled pair 16$a$ and 16$b$ is provided similarly to FIG. 1, except that the upper path 16$b$ is controllable as a result of the incorporation therein of a cryotron gate element 28 over which a control element 30 has been orthogonally deposited in the manner of a conventional crossed-film cryotron. In the construction shown in FIG. 4, it is the bottom path 16a which is controlled by the incorporation therein of a cryotron gate element 28, the control element 30 being orthogonally deposited over the upper path 16b. The construction of FIG. 5 is functionally the same as that of FIGS. 3 and 4, except that the orthogonal control element 30 is deposited directly over the gate element 28, with the upper path 16b being deposited over the control element 30.

In order to fully appreciate the operation of the structures of FIGS. 3–11, the effect of the coupled pair construction on the operation of the crossed-film cryotrons incorporated therein will now be considered. In this connection two factors are of prime importance. First, it is to be noted that because of the presence of the superconducting ground plane 12, the magnetic field arising as a result of current flowing in a path will be concentrated between the path and the superconducting ground plane, with negligible magnetic field being present elsewhere. Hence, in the structure of FIG. 3 in which the cryotron gate element 28 is in the upper path 16b, current flowing in the lower path 16a will have no effect on the operation of the crossed-film cryotron and it will operate in a conventional manner to gate current in the gate element 28 in response to current in the control element 30.

On the other hand, when the cryotron gate element 28 is in the lower path 16a of the coupled pair, as in the structures of FIGS. 4 and 5, it follows from the discussion in the previous paragraph that the gate element 28 will be coupled by the magnetic field produced by current flowing in the upper path 16a, since it is between path 16b and the superconducting ground plane 12. This is where the second of the two factors comes into play. Although the magnetic field produced by current flowing in the upper path 16b will couple the cryotron gate element 28 in the structures of FIGS. 4 and 5, its effect is negligible, since the magnetic field produced by current flowing in the reduced-width control element 30 will be much more concentrated than that produced by the same current flowing in the wider path 16b in FIGS. 4 and 5, and will thereby produce a much greater effect on the portion of the cryotron gate element 28 thereunder. The operation of the crossed-film cryotron is thus conveniently made essentially independent of whether current is flowing in the upper strip 16b in the structures of FIGS. 4 and 5 by designing the cryotron so that only the highly concentrated field produced by current flowing in the reduced-width control element 30 is sufficient to switch the gate element from the superconducting to resistive state. The much less concentrated magnetic field produced by current flowing in the upper path 16a in FIGS. 4 and 5 will then be insufficient to affect the state of the cryotron gate element 28 and may be ignored. The end result is that regardless of whether the cryotron gate element 28 is in the upper path 16b (as in FIG. 3) or in the lower path 16a (as in FIGS. 4 and 5) the cryotron will operate in a conventional manner to control the state of the gate element 28 in response to current flowing in the control element 30 and, most importantly, this is accomplished in a manner which preserves the advantageous coupled pair construction. It is further to be noted that because the deposited strips of which the superconductive circuitry is formed are relatively thin compared to their width, it makes little difference from a functional point of view whether the control element 30 is provided over the upper path 16b as in FIG. 4 or below the upper path 16b as in FIG. 5, the choice being merely a matter of structural convenience. The reason for this is that, although a magnetic field does not directly propagate through a superconductor, it does induce a current therein which in turn produces a magnetic field having a substantially equivalent effect on the next lower strip.

Figures 12, 22, 28, 29, 30:
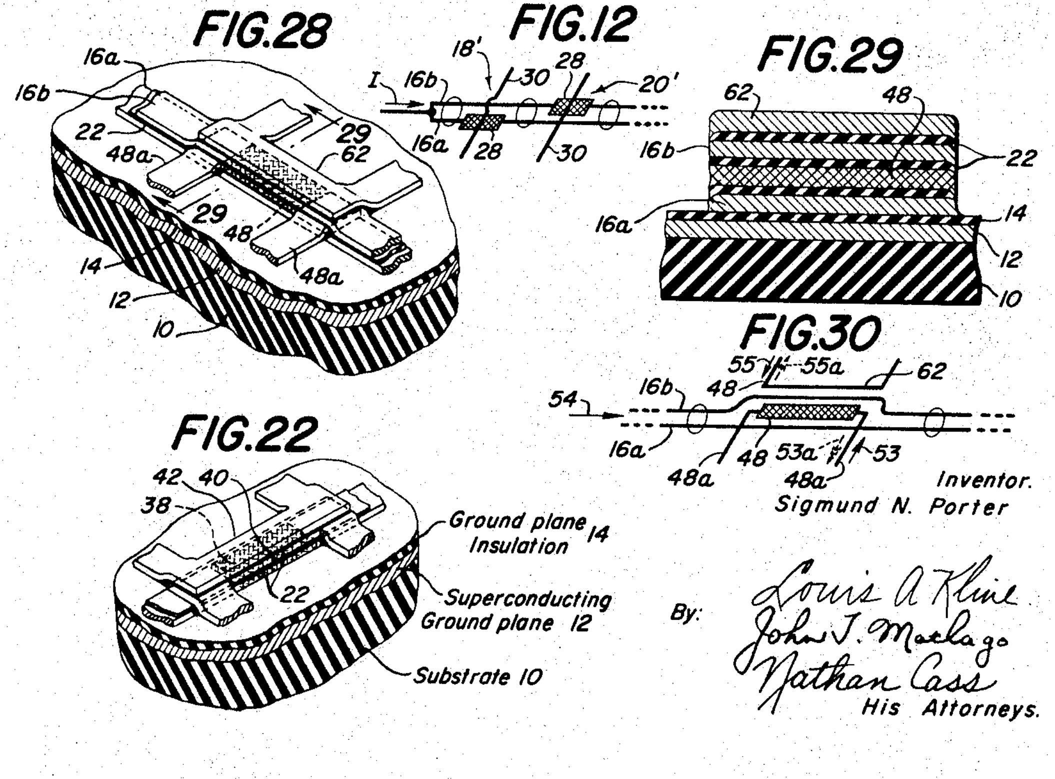
FIG. 12 is a schematic diagram illustrating how the cross-film cryotron structures of FIGS. 3 and 4 may be employed in FIG. 1.
FIG. 22 is a pictorial view illustrating the construction of a conventional in-line cryotron.
FIG. 28 is a pictorial view illustrating how a coupled pair can be employed to control an in-line cryotron gate element without requiring decoupling of the coupled pair.
FIG. 29 is a cross-sectional view taken along the line 29—29 in FIG. 28.
FIG. 30 is a schematic representation of the structure illustrated in FIGS. 28 and 29.

Now that the construction and operation of the embodiments of FIGS. 3–11 have been described, it will be understood with reference to FIG. 1 that instead of providing the cryotrons 18 and 20 separately from the coupled pair as shown therein, these cryotrons 18 and 20 could be incorporated into the coupled pair using the constructions of FIGS. 3–11. More specifically, cryotron 20 could be incorporated into the upper path 16b of the coupled pair using the construction of FIG. 3, and cryotron 18 could be incorporated into the lower path 16a of the coupled pair using the construction of either FIG. 4 or FIG. 5. The manner in which this incorporation may be accomplished is schematically illustrated in FIG. 12 using the schematic nomenclature of FIGS. 9–10. The cryotrons designated as 18' and 20' in FIG. 12 have been substituted for cryotrons 18 and 20 in FIG. 1.

*Incorporation of an in-line cryotron in the coupled pair construction (FIGS. 13–23)*

So far, it has been demonstrated how cryotrons of the crossed-film type can be incorporated into the coupled pair construction. Cryotrons of the in-line type are also capable of such incorporation as will now be demonstrated with respect to FIGS. 13–23 for three types of constructions. Considering FIGS. 13–21 first, the same manner of illustration is used therein as in FIGS. 3–11—that is, three types of constructions are first shown pictorially in FIGS. 13–15; appropriate cross-sectional views FIGS. 16–18, respectively, are then shown below; and below these are shown schematic diagrams FIGS. 19–21, respectively. Also, the supporting substrate 10, the superconducting ground plane 12, the ground plane insulation 14, the paths 16a and 16b of the coupled pair, and the insulation 22 retain the same numbering in FIGS. 13–21 as in the previous figures. However, different numbering is used for the in-line cryotrons in order to distinguish them from the previously considered crossed-film cryotrons, the numbering being as follows. The in-line cryotron gate element is designated by the numeral 38, the in-line control element by the numeral 40, and the bias element (provided in FIG. 13 only) by the numeral 42.

Before considering FIGS. 13–21 in detail, the basic construction and operation of an in-line cryotron will be briefly considered with reference to FIG. 22 (on the same sheet as FIGS. 3–11). As is well-known, an in-line cryotron differs from a cross-film cryotron in that, instead of having its control element deposited orthogonally over the gate element (as in the crossed-film cryotron), the in-line cryotron has its control element deposited over the gate element so as to be parallel thereto. Also, in order to have a gain greater than unity, a suitable bias element is required. A typical conventional in-line cryotron construction is shown in FIG. 22 (on the same sheet as FIGS. 3–11), the control element 40 being deposited over the gate element 38, and a bias element 42 being deposited over the control element 40. All elements are suitably insulated from one another by insulation 22. Functionally, operation of the in-line cryotron illustrated in FIG. 22 is similar to that of the crossed-film cryotron in that current applied to the control element 40 serves to switch the gate element 38 from the superconducting to the resistive state. A bias current is applied to the bias element 42 in FIG. 22 so as to flow in the same direction as current in the control element 40. The bias aids switching by the control current and thereby makes possible a gain greater than unity.

The primary value of a conventional in-line cryotron as illustrated in FIG. 22 is that the entire length of gate element 38 lying below the control element 40 is driven resistive, instead of just a narrow section as in the crossed-film cryotron. It is thus possible to obtain a much greater resistance of the gate element 38 when it is in the resistive state by suitably increasing its length. This increased resistance is advantageous in that the switching time constant (which is $L/R$ where L is inductance and R is resistance) can be considerably reduced to increase switching speed. Also, the increased resistance is useful in that it permits more convenient impedance matching to output lines.

However, while the in-line cryotron provides the above advantages, it has the disadvantage that the current gain is less than unity as a result of the gate and control elements (38 and 40 in FIG. 22) having the same width. It is necessary, therefore, to provide an additional bias element (42 in FIG. 22) which is deposited over and parallel to the control element 38 and suitably insulated therefrom for the purpose of biasing the in-line cryotron to a point where current gain can be obtained.

Having briefly described the construction and operation of a conventional in-line cryotron, the three constructions of FIGS. 13–21 in which in-line cryotrons are incorporated into the coupled pair construction will now be considered in more detail. As best shown in the respective schematic diagrams of FIGS. 19–21, the in-line cryotron gate element 28 is incorporated in the upper path 16*b* of the coupled pair 16*a*, 16*b* in the structure of FIG. 13 and in the lower path 16*b* in the structures of FIGS. 14 and 15. The control element 40 is deposited over the upper path 16*b* in the structures of FIGS. 13 and 15, and under the upper path 16*b* in the structure of FIG. 14. The structure of FIG. 13 also includes a conventional type of bias element 42 which is deposited over the control element 40.

To understand the operation of the structures of FIGS. 13–21, it should be remembered (as pointed out previously) that the magnetic field arising as a result of current flowing in a path will be concentrated between the path and the superconducting ground plane, with negligible magnetic field being present elsewhere. Thus, it will be understood that, in the structure of FIG. 13 where the gate element 38 is in the upper path 16*b*, current flowing in the lower path 16*a* will not affect normal in-line cryotron operation. Hence, the in-line cryotron in the structure of FIG. 13 will operate in a conventional manner in response to current in the control element 40 and the bias element 42 to control current flow in the upper path 16*b*.

Figures 13, 14, 15:
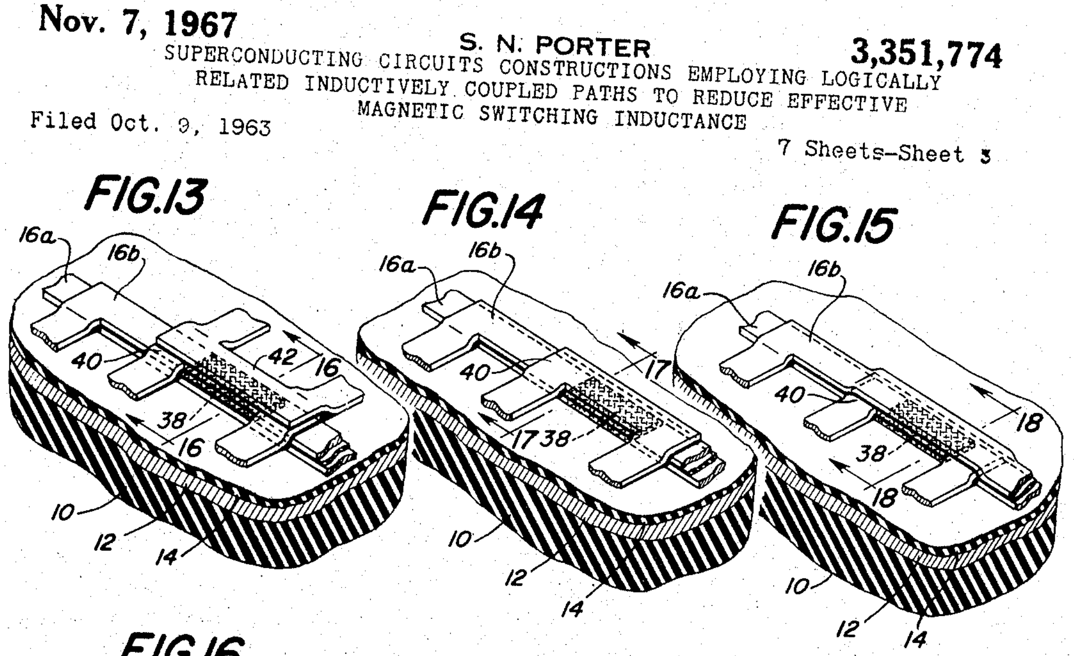
FIGS. 13–15 are pictorial views respectively illustrating three types of structures for incorporating an in-line cryotron into the coupled pair construction of the present invention.
Figure 16:
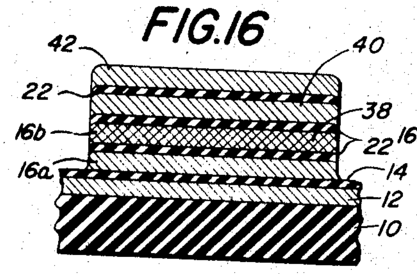
FIGS. 16–18 are cross-sectional views taken along the lines 16—16, 17—17 and 18—18 in FIGS. 12–14, respectively.
Figure 17:
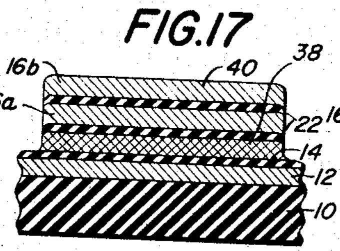
Figure 18:
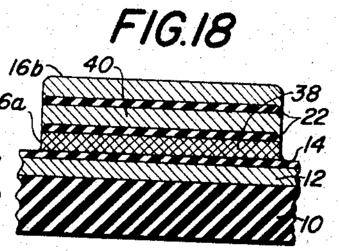
Figure 19:
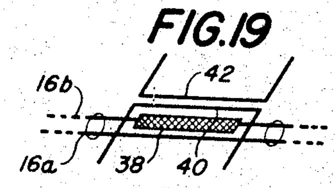
FIGS. 19–21 are schematic diagrams representing the structures illustrated in FIGS. 13 to 15, respectively.
Figure 20:
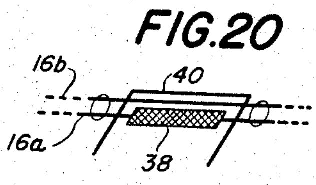
Figure 21:
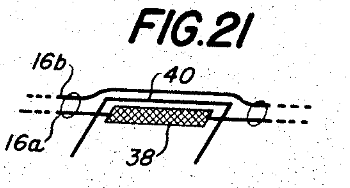

In the structures of FIGS. 14 and 15 (which are functionally equivalent), the gate element 38 is in the lower path 16*a* and will thereby be affected by current flow in the upper path 16*b*, as well as by current flowing in the control element 40. Such a condition has been found to be highly advantageous, since positive feedback will then occur during switching of the coupled pair. This positive feedback makes it possible to achieve current gain without the necessity of a bias element (such as 42 in FIG. 13). The reason why this positive feedback is obtained will be understood from the following discussion. It will be assumed for purposes of explanation that the gate element 38 in the structures of FIGS. 14 and 15 is superconducting, and that current is initially flowing in the lower path 16*a* of the coupled pair. Switching of the coupled pair is then accomplished by applying current to the control element 40 to drive the gate element 38 to its resistive state. The current in the control element is sufficient to make the gate element 38 resistive when current flows in the lower path 16*a*, and after switching, the combined effect of the current in the upper path 16*b* and the control element 40 is sufficient to make the gate element 38 resistive even though no current is flowing therethrough. Thus, it will be understood that, as switching begins and current in the lower path 16*a* begins to be switched to the upper path 16*b*, the magnetic field produced by the increasing current in the upper path 16*b* will aid the field produced by current in the control element 40. A similar positive feedback occurs when current is switched from the upper path 16*b* to the lower path 16*a*. The result is that the constructions of FIGS. 14 and 15 not ony achieve the faster switching time and reduced energy requirements made possible by the coupled pair construction, but also, because of positive feedback a higher current gain is obtained which can be made greater than unity so as to eliminate the need for a bias.

Figure 23:
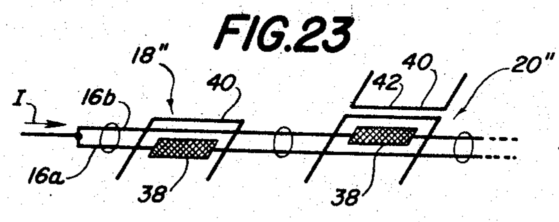
FIG. 23 is a schematic diagram illustrating how the in-line cryotron structures of FIGS. 13 and 14 may be employed in FIG. 1.

Having described the construction and operation of the structures of FIGS. 13–21, it should now be evident that, just as the crossed-film structures of FIGS. 3–11 can be used to provide the equivalent operation performed by the cryotrons 18 and 20 in FIG. 1 in a manner which retains the advantageous coupled pair construction, so can the in-line cryotron structures of FIGS. 13–21. More specifically, cryotron 20 in FIG. 1 can be incorporated into the upper path 16*b* of the coupled pair using the in-line cryotron structure of FIG. 13, and cryotron 18 in FIG. 1 can be incorporated into the lower path 16*a* of the coupled pair using the in-line cryotron structure of either FIG. 14 or FIG. 15. The manner in which this incorporation may be accomplished is schematically illustrated in FIG. 23 (located on the same sheet as FIGS. 31–35) using the schematic nomenclature of FIGS. 19 and 20. The cryotrons designed as 18″ and 20″ in FIG. 22 have been substituted for cryotrons 18 and 20, respectively, in FIG. 1.

*Interchange joint for interchanging upper and lower paths of the coupled pair (FIGS. 24–26)*

It will be apparent from the previous description of the in-line cryotron structures of FIGS. 13–21 that, while an in-line cryotron can be incorporated into the upper path 16*b* of a coupled pair, such as illustrated in FIG. 13, it is preferable to incorporate the in-line cryotron into the lower path using the structures of FIG. 14 or FIG. 15 because of the advantages gained by positive feedback, as explained previously. It would be most desirable, therefore, to provide a convenient way of interchanging the top and bottom paths 16*a* and 16*b* of the coupled pair so that both paths could be controlled by in-line cryotrons located in the lower path. A preferred way in which this interchanging of paths can be accomplished is illustrated in FIGS. 24–26 in which FIG. 24 is a pictorial view, FIG. 25 is a cross-sectional view taken along the line 25—25 in FIG. 24, and FIG. 26 is a schematic diagram which functionally illustrates the interchange of paths produced by the interchange construction illustrated in FIGS. 24 and 25.

Figure 24:
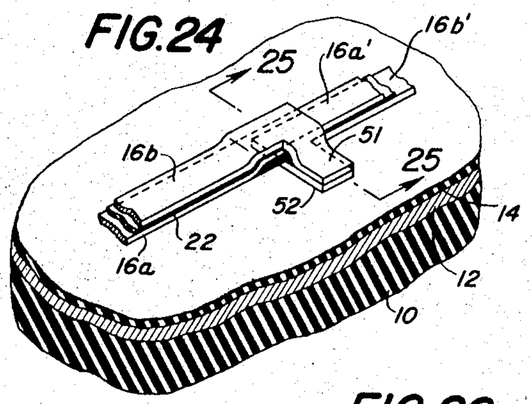
FIG. 24 is a pictorial view illustrating the construction of an interchange joint used for interchanging the upper and lower paths of a coupled pair.
Figure 25:
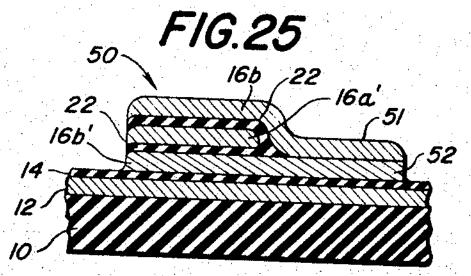
FIG. 25 is a cross-sectional view taken along the line 25—25 in FIG. 24.

Considering FIGS. 24 and 25 in more detail, it will be seen that these figures show a construction for changing the coupled pair so that the lower path 16*a* becomes the upper path 16*a′* and the upper path 16*b* becomes the lower path 16*b′*. As illustrated in FIGS. 24 and 25, this is accomplished by providing an interchange joint 50 having right angle projections 51 and 52 which extend out perpendicularly from the coupled pair and are appropriately connected to each other and to the paths 16*b* and 16*b′*. More specifically, the projections 51 and 52 are formed by terminating paths 16*b* and 16*b′* in respective right angle projections, the projection 51 from path 16*b* curving downward (as seen in FIGS. 24 and 25) to meet and make electrical contact with projection 52 from path 16*b′*. The upper path 16*b* is thus interchanged into the lower path 16*b′*. The interchange of the lower path 16*a* to the upper path 16*a′* is accomplished by curving the lower path 16*a* upward over projection 52 and under projection 51 from where it runs over path 16*b′* to thereby form the upper path 16*a′* of the resulting coupled pair 16*a′*, 16*b′*, suitable insulation 22 being provided as necessary.

Figure 26:
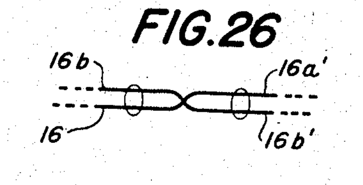
FIG. 26 is a schematic diagram representing the interchange structure illustrated in FIGS. 24 and 25.
Figure 27:
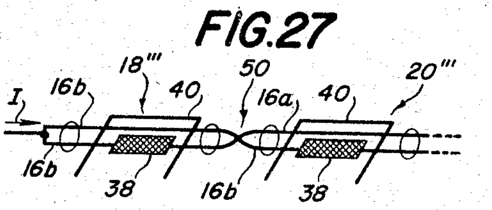
FIG. 27 is a schematic diagram illustrating how the interchange joint of FIG. 24 can be employed in FIG. 1 along with the structure of FIG. 14.

It will now be evident that by using the interchange joint 50 illustrated in FIGS. 24–26 to interchange the upper and lower paths of the coupled pair shown in FIG. 1, the in-line cryotron structure of either FIG. 14 or FIG. 15 can be used for incorporating both of the cryotrons 18 and 20 into the coupled pair construction, as illustrated in the schematic diagram of FIG. 27 (located on the same sheet as FIGS. 31–35). The cryotrons 18‴ and 20‴ in FIG. 27 on opposite sides of the interchange joint 50 perform the same functions as cryotrons 18 and 20 in FIG. 1.

*Use of a coupled pair to control an in-line cryotron gate element (FIGS. 28–30)*

Having demonstrated how both crossed-film and in-line cryotrons can be incorporated into the coupled pair construction, it will next be demonstrated with reference to FIGS. 28–32 how a coupled pair can be used to control cryotron gate elements, without requiring decoupling of the coupled pair as is done in FIG. 1 to control cryotrons 24 and 26. First to be considered will be the structure illustrated in FIGS. 28–30 (located on the same sheet as FIGS. 3–11) which involves in-line cryotron gate elements. It will be noted that FIGS. 28–30 are provided in the same manner as those used for other structures—that is, FIG. 28 is a pictorial view, FIG. 29 is a cross-sectional view taken along the line 29—29 in FIG. 28, and FIG. 30 is a schematic diagram of the structure illustrated in FIGS. 28 and 29.

The purpose of the structure of FIGS. 28–30 is to permit a coupled pair 16*a*, 16*b* to control a conventional in-line cryotron gate element 48 without requiring decoupling of the coupled pair—that is, the coupled pair 16*a*, 16*b* acts like an in-line cryotron control element (such as 40 in FIGS. 13–21) to control whether the gate element 48 is superconducting or resistive. As best seen in FIG. 30, the cryotron gate element 48 which is to be controlled is deposited between paths 16*a* and 16*b* of the coupled pair. The element 62 deposited over the upper path 16*b* serves as a bias element.

The important difference to note with regard to the in-line cryotron structure of FIGS. 28–30 and those of FIGS. 13–21 is that the cryotron control element 48 is not incorporated in or electrically connected to either path of the coupled pair 16*a*, 16*b* in FIGS. 28–30, the coupled pair 16*a*, 16*b* serving merely to control the state of the cryotron gate element 48 using the magnetic coupling therebetween. The lead extensions 48*a* attached to the thus controlled cryotron gate element 48 permit it to be electrically connected, as desired, to any other portions of the cryotron circuitry.

The operation of the structure of FIGS. 28–30 will now be considered in detail, FIG. 30 being best for this purpose. Initially, it is to be remembered that current flowing in the lower path 16*a* will not affect the gate element 48, since the magnetic field will be concentrated between the lower path 16*a* and the superconducting ground plane 12. Hence, it is the currents in the upper path 16*b* and the bias element 62 which will determine the state of the gate element 48.

For purposes of explanation, it will be assumed that when current flows in either path 16*a* or 16*b* of the coupled pair, the direction of current flow will be as indicated by the arrow 54. It will also be assumed that when the gate element 48 is superconducting so as to permit current to flow therein, the direction of current flow will be as indicated by the arrow 53. If it is now desired that the gate element 48 be resistive when current flows in the upper path 16*b*, the current in the bias element 62 is chosen to be in the direction of the arrow 55 and of such magnitude as to be insufficient by itself to switch the gate element 48 to its resistive state. Then, when current flows in the upper path 16*b* in the direction of the arrow 54, the field produced thereby will add to the field produced by current flowing in the bias element 62, and the two together will be sufficient to switch the gate element 48 to its resistive state. It is to be noted that the self magnetic field produced by current flowing in the gate element 48 is a factor to be considered during switching and its direction should properly be chosen, as indicated by the arrow 53, so that the change in magnetic field in the gate element 48 during switching is in a direction which aids switching. For the situation where current flows in the lower path 16*a* instead of the upper path 16*b*, the gate element 49 will be unaffected and will remain superconducting. The desired control of the gate element 48 in response to current flow in the coupled pair 16*a*, 16*b* is thus achieved.

It will now be assumed with respect to FIGS. 28–30 that it is desired that the gate element 48 be resistive when current is in the lower path 16*a* of the coupled pair, instead of in the upper path as assumed in the previous paragraph. To obtain this condition the current in bias element 62, is chosen, as indicated by the dashed arrow 55A, to be in the opposite direction to current flow in the coupled pair, with a magnitude chosen so that the gate element 48 will be resistive when current is in the lower path 16*a*, and superconductiing when current is in the upper path 16*b*. In other words, when current flows in the lower path 16*a* the only magnetic field applied to the gate element 48 will be that resulting from current flow in the bias element 62, since as explained previously, the magnetic field produced by current in the lower path 16*a* does not couple the gate element 48. On the other hand, when current flows in the upper path 16*b*, the magnetic field produced thereby will oppose and effectively cancel the magnetic field produced by current flowing in the bias element 62, causing the gate element to become superconducting as is desired for this type of operation. It will be understood that the correct direction of current flow in the gate element 48 when it is superconducting is now the direction indicated by the dashed arrow 53*a*.

*Use of a coupled pair to control a crossed-film cryotron gate element (FIGS. 31–35)*

Figure 31:
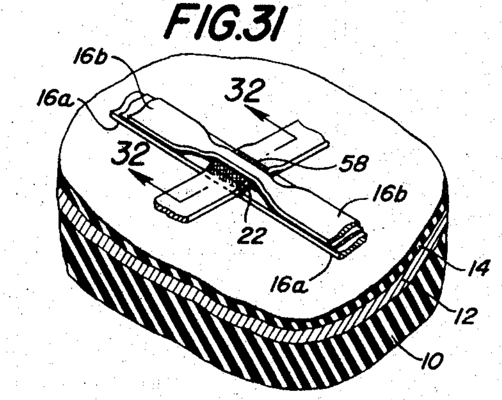
FIG. 31 is a pictorial view illustrating how a coupled pair can be employed to control a crossed-film cryotron gate element without requiring decoupling of the coupled pair.
Figure 32:
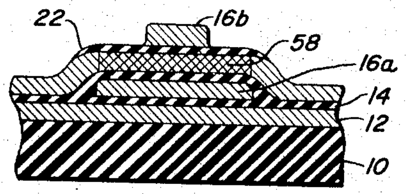
FIG. 32 is a cross-sectional view taken along the line 32—32 in FIG. 31.
Figure 33:
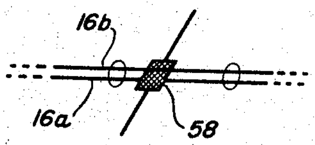
FIG. 33 is a schematic diagram representation of the structure illustrated in FIGS. 31 and 32.

A coupled pair may be employed to control a crossed-film cryotron gate element without requiring decoupling of the coupled pair in a manner analogous to that which has just been described for an in-line gate element, except that the direction of current flow in the crossed-film gate element is immaterial. FIGS. 31–33 are respectively pictorial, cross-sectional and schematic views illustrating a crossed-film cryotron structure of this type.

In FIGS. 31–33, since the gate element 58 is located between the upper and lower paths 16*a* and 16*b* of the coupled pair, it will be quite evident that operation is such that when current is flowing in the upper path 16*b*, the crossed-film cryotron gate element 58 will be resistive, and when current is flowing in the lower path 16*a*, the cryotron gate element 58 will be unaffected and will thereby be superconducting. It will be noted in FIG. 31 that since the upper path 16*b* serves as the control element for the gate element 58, it is provided with a reduced width where it crosses the gate element 58. It is also to be noted that, because crossed-film cryotron operation is involved, the direction of flow of current in the gate element 58 is immaterial.

Figure 34:
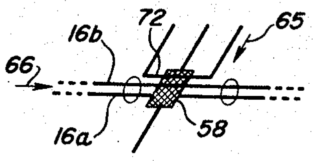
FIG. 34 is a schematic diagram illustrating the addition of a bias element to the structure of FIGS. 31–33.

In FIG. 34, operation is just the opposite to that of FIG. 31, the gate element 58 being resistive when current is flowing in the lower path 16*a* of the coupled pair 16*a*, 16*b*, and superconductive when current is flowing in the upper path 16*b*. For this type of operation, a bias element 72 is required, which, like the upper path 16*b* will also be of reduced width where it crosses the gate element 58, and is deposited over the reduced upper path 16*b* with suitable insulation being provided therebetween. Current is applied to the bias element 72, as indicated by the arrow 65, in a direction opposite to current flow in the coupled pair, and with a magnitude sufficient to maintain the gate element 58 resistive. The arrow 66 indicates the direction of flow of current in the coupled pair 16*a*, 16*b*. It will now be evident that operation of FIG. 34 will be such that when current flows in the lower path 16*a*, the gate element 58 will be unaffected thereby and will remain resistive as a result of the influence of the magnetic field produced by current flowing in the bias element 72. On the other hand, when current flows in the upper path 16*b*, it acts to cancel the magnetic field produced by current flowing in the bias element 72, thereby causing the gate element 58 to be superconducting.

Figure 35:
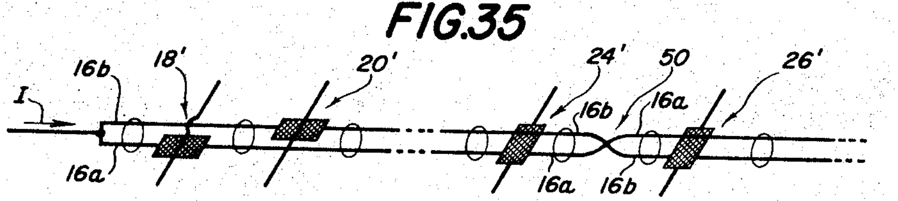
FIG. 35 is a schematic diagram illustrating how the cross-film cryotron structure of FIG. 33 and the interchange joint of FIG. 24 can be employed along with the cross-film structures of FIGS. 3 and 4 to replace the cryotrons in FIG. 1.

A further example of how a coupled pair can be used to control a crossed-film cryotron gate element is shown in FIG. 35 which is a coupled pair equivalent of FIG. 1. In FIG. 35 the structures designated 18' and 20' correspond to the structures of FIGS. 10 and 9, respectively, and are substituted for cryotrons 18 and 20 in FIG. 1 in the same manner as illustrated in FIG. 12. Additionally, the structure of FIGS. 31–33 designated 24' and 26' in FIG. 33 in conjunction with the interchange joint 50 of FIG. 24 are substituted for cryotrons 24 and 26 in FIG. 1. It will be understood from FIG. 35 that the upper path **16*b* controls the cryotron gate element of cryotron 24' in the same manner as it controls the cryotron gate element 24 in FIG. 1. Likewise, the lower path 16*a* (which becomes the upper path to the right of the interchange joint 50 in FIG. 33) controls the cryotron gate element of cryotron 26' in the same manner as it controls the cryotron gate element 26 in FIG. 1. The important point, though, is that this control of these cryotrons 24' and 26' is accomplished while maintaining the advantageous coupled pair construction. It will of course be appreciated that although crossed-film cryotron constructions are illustrated in FIG. 35, the same result could be obtained for in-line cryotrons using the construction of FIG. 28 for cryotrons 24 and 26 in FIG. 1 along with the construction of either FIG. 23 or FIG. 27 for cryotrons 18 and 20** in FIG. 1.

*Coupled pair controlled by a coupled pair (crossed-film case) (FIGS. 36–42)*

The advantageous coupled pair construction of the present invention can be even further extended than so far described to the situation where two coupled pairs meet at a junction at which one coupled pair controls one or both paths of the other coupled pair.

Figure 36:
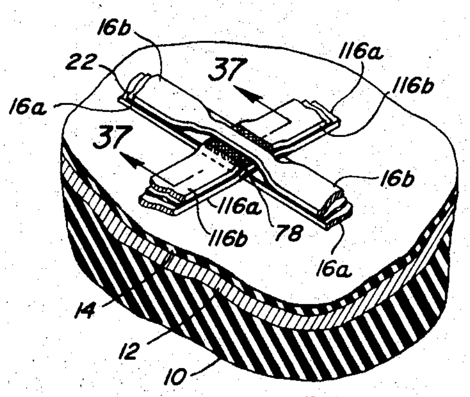
FIG. 36 is a pictorial view illustrating how a coupled pair can be employed to control the upper path of a second coupled pair using a crossed-film gate element.
Figure 37:
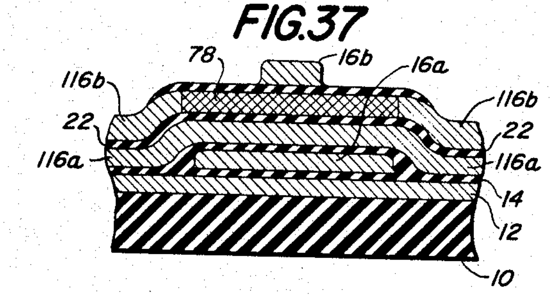
FIG. 37 is a cross-sectional view taken along the line 37—37 in FIG. 36.
Figure 38:
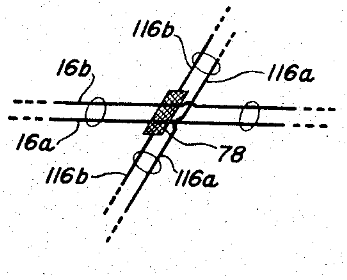
FIG. 38 is a schematic diagram of the structure illustrated in FIGS. 36 and 37.

As an example, FIGS. 36–38 are respectively pictorial, cross-sectional and schematic views illustrating the situation where a coupled pair **16*a*, 16*b* controls a crossed-film cryotron gate 78 located in the upper path 16*b* of a second coupled pair 116*a*, 116*b*. As will best be understood by reference to the schematic diagram of FIG. 38, when current flows in the upper path 16*b* of the coupled pair 16*a*, 16*b*, the cryotron gate element 78 in the upper path 116*b* of the coupled pair 116*a*, 116*b* will be driven to its resistive state. However, when current flows in the lower path 16*a*, the cryotron gate element 78 will be unaffected and will remain superconducting. As in the structure of FIG. 31, since the upper path 16*b* serves as a control element it is made of reduced width where it crosses the gate element 78**.

Figure 39:
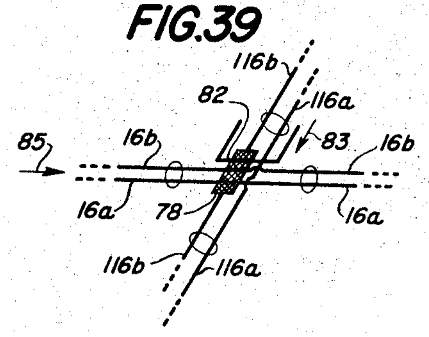
FIG. 39 is a schematic diagram illustrating the addition of a bias element to the structure of FIGS. 36–38.

If it is desired that the gate element 78 in FIGS. 36–38 be resistive when current is flowing in the lower path **16*a* (rather than in the upper path 16*b* as in the previous paragraph), then a bias element 82 is provided as schematically illustrated in FIG. 39. This bias element 82, like the upper path 16*b*, is also of reduced width where it crosses the gate element 78 and is deposited over the upper path 16*b* separated by suitable insulation. Current is applied to the bias element 82 in the direction indicated by the arrow 83 so as to be opposite to the direction of current flow in the coupled pair 16*a*, 16*b* which is indicated by the arrow 85. The magnitude of the current in the bias element 82 is chosen to have a magnitude such that it acts to maintain the gate element 78 resistive. Hence, operation of the structure represented by FIG. 39 is such that when current flows in the lower path 16*a*, the gate element 78 is resistive, and when current flows in the upper path 16*b*, the magnetic field produced thereby acts to cancel out the bias field and thereby make the gate element 78** superconducting.

Figure 40:
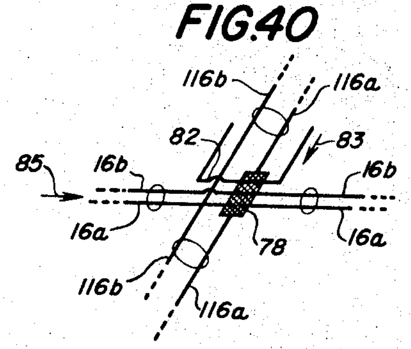
FIGS. 40 and 41 are schematic diagrams illustrating how a coupled pair can be employed to control the lower path of a second coupled pair using a crossed-film gate element.
Figure 41:
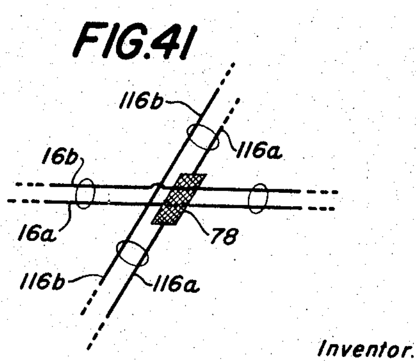

It will be understood that if it is desired to control the lower path **116*a* of the coupled pair 116*a*, 116*b* in FIGS. 36–39 instead of the upper path 116*b* as shown therein, this may be accomplished simply by placing the gate element 78 in the lower path 116*a* instead of the upper path 116*b*, as illustrated in FIGS. 40 and 41. This may be done, as pointed out earlier herein in connection with FIGS. 4–11, because current in the normal width upper path 116 will apply only a negligible magnetic field to the gate element 78 as compared to the highly concentrated magnetic field produced by current flowing in the reduced width control element which, in FIGS. 36–39, is part of the upper path 16*b***.

Figure 42:
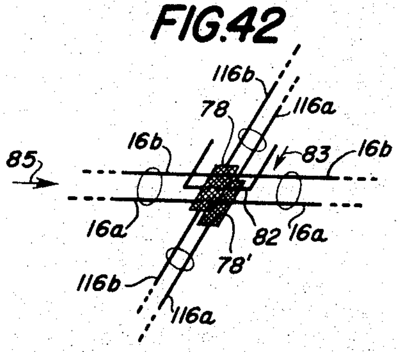
FIG. 42 is a schematic diagram illustrating how a coupled pair can be employed to control both paths of a second coupled pair using a crossed-film gate element in each path of the second coupled pair.
Figure 43:
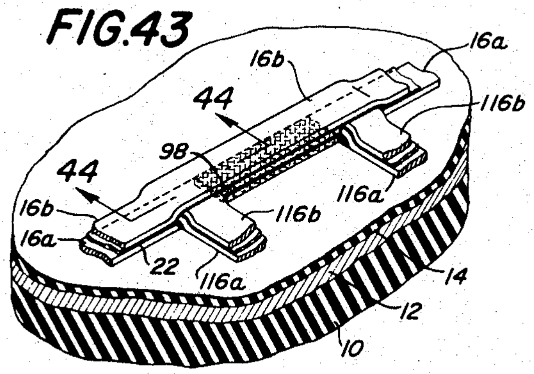
FIG. 43 is a pictorial view illustrating how a coupled pair can be employed to control the lower path of a second coupled pair using an in-line cryotron gate element.
Figure 44:
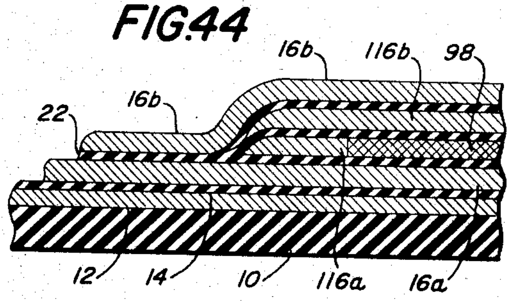
FIG. 44 is a cross-sectional view taken along the line 44—44 in FIG. 43.

A further extension of the dual coupled pair construction is schematically illustrated in FIG. 42 in which both paths of a first coupled pair **116*a*, 116*b* are controlled in response to a second coupled pair 16*a*, 16*b*. This is accomplished by providing a gate element in both paths of the coupled pair 116*a*, 116*b*. As shown in FIG. 43, gate element 78 is provided in the upper path 116*b* and gate element 78' is provided in the lower path 116*a*, both of paths 116*a* and 116*b* being located between paths 16*a* and 16*b* of the coupled pair 16*a*, 16*b* which is to do the controlling. Also, a bias element 82 is provided between gate elements 78 and 78' and a current is applied thereto, in the direction indicated by the arrow 83, so as to be opposite to the direction of current flow in the coupled pair 16*a*, 16*b* indicated by the arrow 85. The magnitude of the current applied to the bias element 92 is chosen so as to act to maintain the lower gate element 78' resistive, the current in the bias element 82 having no effect on the upper gate element 78. It will be understood that since the upper and lower gate elements 78 and 78' have the same width, current in the upper gate element 78 will have negligible effect on the lower gate element 78'**.

The operation of the structure of FIG. 42 will therefore be such that when current flows in the lower path **16*a* of the coupled pair 16*a*, 16*b*, neither of the gate elements 78 or 78' will be affected thereby. Consequently, the lower gate element 78' will be resistive as a result of the bias field, while the upper gate element 78 will be superconducting. When current flows in the upper path 16*b* of the coupled pair 16*a*, 16*b*, the upper gate element 78 will now become resistive, while the lower gate element 78' will become superconducting as a result of the magnetic field produced by current flow in path 16*b* cancelling the bias magnetic field produced by current flowing in the bias element 82. In effect, therefore, the operation of the structure of FIG. 43 is a transfer type of operation in which the binary state represented by current flowing in either of the paths of the coupled pair 16*a*, 16*b* is transferred to the coupled pair 116*a*, 116*b***.

*A coupled pair controlled by a coupled pair (in-line case) (FIGS. 43–49)*

Figure 45:
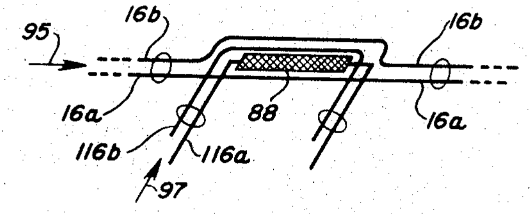
FIG. 45 is a schematic diagram of the structure illustrated in FIGS. 43 and 44.

FIGS. 43–49 illustrate how a first coupled pair **16*a*, 16*b* meeting at a junction with a second coupled pair 116*a*, 116*b* may be employed to control one or both paths of the second coupled pair using in-line cryotron gate elements. Considering FIGS. 43–45 first, these are respectively pictorial, cross-sectional and schematic views of a structure in which a coupled pair 16*a*, 16*b* controls an in-line cryotron gate element 88 located in the upper path 116*b* of a second coupled pair 116*a*, 116*b*. As will best be understood by reference to the schematic diagram of FIG. 45, operation is such that when current flows in the upper path 16*b* of the coupled pair 16*a*, 16*b*, the cryotron gate element 88 in the upper path 116*b* of the coupled pair 116*a*, 116*b* will be driven to its resistive state. However, when current flows in the lower path 16*a*, the cryotron gate element 88 will be unaffected and will thereby be superconducting. It will be understood that because the gate element 88 is in the lower path of the coupled pair 116*a*, 116*b* in the structure of FIG. 43, positive feedback occurs during switching (as in the structure of FIG. 14), so that a bias element is not required. It is to be noted that (as in FIG. 14), the direction of current flow in the in-line gate element 88 is a factor to be considered during switching, and the appropriate directions of current flow in the two coupled pairs 16***a*, 16*b* and 116*a*, 116*b* are indicated in FIG. 45 by arrows 95 and 97, respectively.

Figure 46:
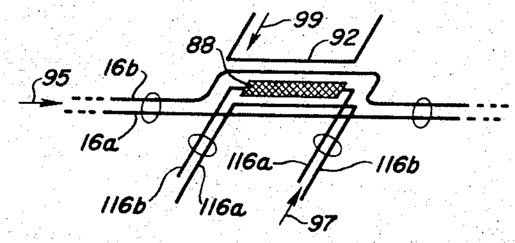
FIG. 46 is a schematic diagram illustrating how a coupled pair can be employed to control the upper path of a second coupled pair using an in-line gate element.

If it is desired that the upper path 116*b* be controlled (rather than the lower path 116*a* as in the previous paragraph) then, as illustrated in FIG. 46, the gate element 88 is moved to the upper path 116*b* and a bias element 92 is required since positive feedback will not be present to provide adequate current gain. With current provided in the directions indicated by the arrows 95, 97 and 99 in FIG. 46, operation is then such that when current flows in the upper path 16*b*, the gate element 88 will be resistive, and when current flows in the lower path 16*a*, the gate element 88 will be superconducting.

Figure 47:
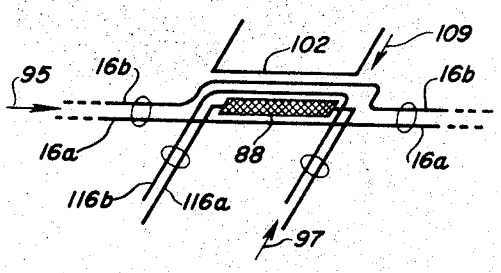
FIGS. 47 and 48 are schematic diagrams illustrating modifications of the structures of FIGS. 45 and 46, respectively.
Figure 48:
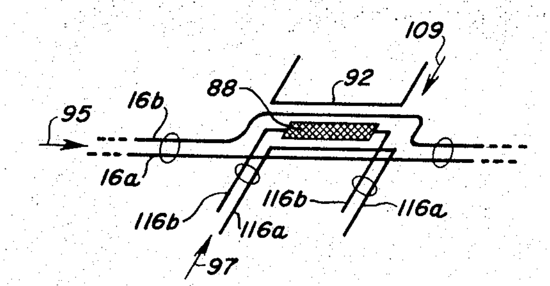

If it is desired that operation in the structures of FIGS. 45 and 46 be such that the gate element 88 is resistive when current is in the lower path 16*a* (rather than in the upper path 16*b*), this may readily be accomplished as illustrated in FIGS. 47 and 48 by providing suitable bias which acts to maintain the gate element 88 resistive. In FIG. 47 (which corresponds to FIG. 45) a bias element 102 is added for this purpose, while in FIG. 48 (which corresponds to FIG. 46), the bias element 92 is already available so that it can be used to provide the correct bias current indicated by the arrow 109. The bias in each of FIGS. 47 and 48 is chosen so that when current flows in the lower path 16*a*, the gate element 88 will be resistive as a result of the bias field, the current in the lower path 16*a* having no effect; however, when current flows in the upper path 16*b*, the magnetic field produced thereby will cancel the bias field and cause the gate element 88 to become superconducting. The arrows 95, 97 and 109 indicate the correct directions of current flow in FIGS. 47 and 48.

Figure 49:
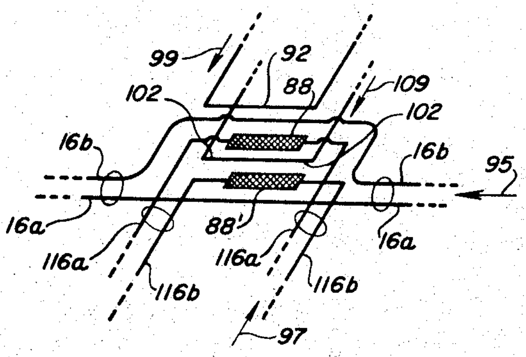
FIG. 49 is a schematic diagram illustrating how a coupled pair can be employed to control both paths of a second coupled pair using an in-line cryotron gate element in each path of the second coupled pair.

The same extension of the dual coupled pair construction illustrated in FIG. 42 using cross-film cryotron gate elements can also be provided in an analogous manner using in-line cryotron gate elements as schematically illustrated in FIG. 49. As in the structure of FIG. 42, the structure of FIG. 49 provides a transfer operation in which both paths of the coupled pair 116*a*, 116*b* are controlled in response to the representative binary state of the coupled pair 16*a*, 16*b*. This is accomplished as illustrated in FIG. 49 by providing respective in-line gate elements 88 and 88′ in upper and lower paths of the coupled pair 116*a*, 116*b* which is to be controlled, the coupled pair 116*a*, 116*b* located between the coupled pair 16*a*, 16*b* which is to do the controlling. Also, a first bias element 92 is provided above the upper gate element 88 to aid switching thereof, and a second bias element 102 is provided between the upper and lower gate elements 88 and 88′ which acts to cancel the effect of the bias element 92 on the lower gate element 88′. With current provided in the directions indicated by the arrows 95, 97, 99 and 109 in FIG. 49, operation is then such that when current flows in the lower path 16*a*, the lower gate element 88′ is superconducting while the upper gate element is resistive due to the relatively large bias current in bias element 92. When current is switched to the upper path 16*b* of the coupled pair 16*a*, 16*b*, the magnetic field produced thereby will cancel enough of the effect caused by current in bias element 92 to allow gate element 88 to become superconducting while causing the lower gate element 88′ to become resistive. It is to be noted that the switching of the lower gate element 88′ is aided by positive feedback in a manner similar to that previously described for the constructions of FIGS. 14 and 15.

*Conclusion*

While the foregoing disclosure has been concerned primarily with certain illustrative embodiments, it is to be understood that the invention is susceptible of many modifications and variations in both construction and arrangement, as well as in operation, besides those disclosed herein. For example, the logic of a system might be such that current is switched among three paths, instead of just between two as illustrated herein; then, in accordance with the present invention, these three paths could be coupled together by depositing them one over the other (with suitable insulation being provided therebetween) so as to maximize the mutual inductance therebetween and thus form a coupled trio which would exhibit the advantages of the coupled pair construction exemplified herein.

Figure 50:
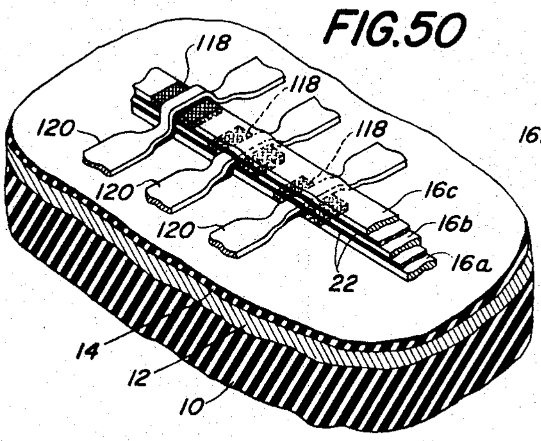
FIG. 50 is a pictorial view illustrating a coupled trio in accordance with the invention having a crossed-film cryotron element incorporated in each path.
Figure 51:
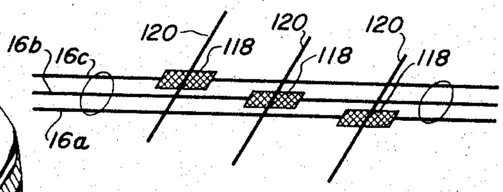
FIG. 51 is a schematic representation of FIG. 50.
Figure 52:
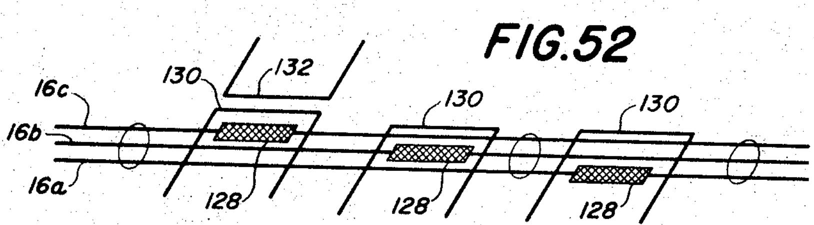
FIG. 52 is a schematic representation illustrating a coupled trio having an in-line cryotron element incorporated in each path.

FIG. 50 is a pictorial view of such a coupled trio of three parallel paths 16*a*, 16*b* and 16*c* in accordance with the invention. FIG. 51 is a schematic representation of FIG. 50. It will be noted that each path contains a cryotron gate element 118 which is controllably switchable between resistive and superconducting states by a respective control element 120 provided in the manner of a cross-film cryotron. It will be understood that a functionally equivalent arrangement could also be provided using in-line cryotrons as schematically shown in FIG. 52 in which the in-line cryotron gate element is designated by the numeral 128, the in-line cryotron control element by the numeral 130, and the bias element (which because of positive feedback is only required when the gate element is in the top path 116*c*) by the numeral 132.

Figure 53:
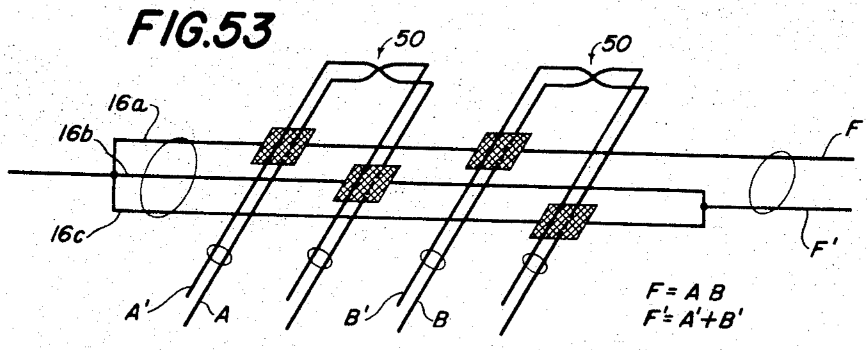
FIG. 53 is a schematic representation of a logical circuit illustrating how a coupled trio may be controlled by one or more coupled pairs to derive a resultant coupled pair representing a desired logical proposition and its complement.

A typical example of a logical circuit using cross-film cryotrons which could advantageously employ a coupled trio is schematically illustrated in FIG. 53. The logic represented by FIG. 53 may conveniently be indicated using conventional Boolean notation by the equations $F=AB$ for the proposition desired and $F'=A'+B'$ for its complement. In other words, in the arrangement of FIG. 53, the coupled trio 16*a*, 16*b*, 16*c* is controlled as shown by the coupled pair A, A′ and the coupled pair B, B′ to generate a resultant coupled pair representing the proposition F and its complement F′. It will be understood that the same logical proposition could also be generated using in-line cryotrons.

The above examples of possible modifications are of course only illustrative of many others that could also be provided within the scope of the present invention. The present invention, therefore, is not to be considered as limited to the specific disclosure provided herein, but is to be considered as including all modifications and variations coming within the scope of the invention as defined in the appended claims.

What is claimed is:

1. In a superconductive circuit, a support having a superconducting ground plane thereon, first and second inductively coupled paths provided on said ground plane as first and second superconductive strips disposed one over the other and insulated from each other and from said ground plane, and means for applying current to said strips so that the strips represent a pair of complementary binary propositions, the state of each proposition being determined by the presence or absence of current flowing in its respective path, said strips being constructed and arranged to run parallel one over the other for substantially the entire distance of travel thereof.

2. The invention in accordance with claim 1, wherein at least one strip includes an element which is controllably switchable between superconducting and resistive states, and wherein control means are additionally provided for switching said element.

3. The invention in accordance with claim 1, wherein each strip includes an element which is controllably switchable between superconducting and resistive states, and wherein control means are additionally provided for switching said elements.

4. The invention in accordance with claim 3, wherein said elements are disposed one over the other.

5. The invention in accordance with claim 1, wherein an element which is controllably switchable between superconducting and resistive states is insulatively disposed between said first and second strips, said element having a relatively low critical switching field with respect to the strip portions parallel thereto so that said strip portions remain superconducting for both states of said element.

6. In a superconductive circuit, a support, a film of superconductive material deposited thereon and serving as a superconducting ground plane, first and second strips of superconductive material provided on said ground plane as upper and lower strips disposed one over the other and insulated from each other and from said ground plane, and means interposed in the path of said strips for interchanging the upper and lower ones thereof, said last mentioned means being constructed and arranged so that the interchange is accomplished in a manner which maintains the strips disposed one over the other.

7. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth paths form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane.

8. In a superconductive circuit, upper and lower inductively coupled strips disposed one over the other and insulated from one another, an in-line cryotron gate element incorporated in the lower strip, a third strip disposed over said lower strip so as to serve as an in-line cryotron control element for said in-line gate element, and means for applying current to said strips so that the switching of said in-line gate element in response to current applied to said third strip is aided by a changing current in said upper strip.

9. In a superconductive circuit, a support having a superconducting ground plane thereon, upper and lower strips disposed on said ground plane one over the other and insulated from one another and from said ground plane, an element incorporated in said lower strip which is controllably switchable between superconducting and resistive state, a control strip disposed over said lower strip and insulated from the other strips and from said ground plane, and means for applying current to said strips so that the switching of the state of said element in response to current applied to said control strip is aided by a changing current in said upper strip to an extent sufficient to achieve a gain greater than unity with respect to currents in said control strip and said element.

10. The invention in accordance with claim 8, wherein said third strip is disposed over said upper strip.

11. The invention in accordance with claim 8, wherein said third strip is disposed between said upper and lower strips.

12. In a superconductive circuit, a support having a superconducting ground plane thereon, a plurality of inductively coupled parallel paths provided on said ground plane as strips disposed one over the other and insulated from each other and from said ground plane, means applying current to said strips so that the sum of the currents flowing therein remains essentially constant, an element incorporated in a strip which is not the top strip, said element being controllably switchable between superconducting and resistive states, and a control strip disposed over said element and insulated from the other strips and from said ground plane, said strips being constructed and arranged so that the switching of the state of said element in response to current applied to said control strip is aided by a changing current in at least one upper strip other than said control strip.

13. In a superconductive circuit, a support having a superconducting ground plane thereon, upper and lower inductively coupled paths provided on said ground plane as upper and lower strips disposed one over the other and insulated from each other and from said ground plane, means applying current to said strips so that they represent a pair of complementary binary logical propositions, an element incorporated in said lower strip which is controllably switchable between superconducting and resistive states, a control strip disposed over said element and insulated from the other strips and from said ground plane, said strips being constructed and arranged so that the switching of the state of said element in response to current applied to said control strip is aided by a changing current in said upper strip to an extent sufficient to achieve a gain greater than unity with respect to currents in said control strip and said element.

14. In a superconductive circuit, a support having a superconducting ground plane thereon, first and second strips disposed one over the other as upper and lower strips on said ground plane and insulated from one another and from said ground plane, means for applying current to said strips so that one strip represents a binary logical proposition and the other its complement, an interchange joint interposed in the path of said strips for interchanging upper and lower ones thereof, an element incorporated in the lower strip on each side of said interchange joint which is switchable between superconducting and resistive states, and control means magnetically coupled to each element for controlling the state thereof.

15. In a superconductive circuit, a support having a superconducting ground plane thereon, first, second and third strips disposed one over the other and insulated from one another and from said ground plane, and means for applying current to said strips so that the sum of the currents flowing therein remains essentially constant with each strip representing a binary logical proposition whose state is determined by the presence or absence of current flowing therein, all three of said strips being constructed and arranged to run parallel one over the other for substantially the entire distance of travel thereof.

16. The invention in accordance with claim 15, wherein one of said strips includes an element having a relatively low critical switching field with respect to the portions of the other strips parallel thereto so as to be controllably switchable between superconducting and resistive states while said portions remain superconducting.

17. The invention in accordance with claim 15, wherein two of said strips include an element having a relatively low critical switching field so as to be controllably switchable between superconducting and resistive states while the parallel portion of the third strip remains superconducting.

18. In a superconductive circuit, a support having a superconducting ground plane thereon, a coupled trio comprised of three strips disposed on said ground plane one over the other and insulated from one another and from said ground plane, an element in one of the strips of said coupled trio which is controllably switchable between superconducting and resistive states, a coupled pair comprised of two strips disposed one over the other on said ground plane and insulated from one another and from said ground plane, and means connecting said coupled pair to magnetically control the state of said element in said coupled trio.

19. In a superconductive circuit, a support having a superconducting ground plane thereon, a coupled trio comprised of three strips disposed on said ground plane one over the other and insulated from one another and from said ground plane, first and second spaced elements in the upper strip of said coupled trio, a third element in the middle strip of said coupled trio, and a fourth element in the lower strip of said coupled trio, each element being controllably switchable between superconducting and resistive states, first and second coupled pairs, each coupled pair being comprised of two strips disposed one over the other on said ground plane and insulated from one another and from said ground plane, and means interconnecting said coupled pairs to said coupled trio so that one of said coupled pairs magnetically controls said first and third elements in said coupled trio and the other of said coupled pairs magnetically controls said second and fourth elements of said coupled trio.

20. In a superconductive circuit, a support having a superconducting plane thereon, first and second inductively coupled paths provided on said ground plane as first and second superconductive strips disposed one over the other and insulated from each other and from said ground plane, at least one of said strips including an element which is controllably switchable between superconducting and resistive states, means for applying current to said strips so that the strips represent a pair of complementary binary propositions, the state of each proposition being determined by the presence or absence of current flowing in its respective path, and a control element provided with respect to said element and insulated therefrom and from said strips and said ground plane and constructed and arranged to permit control of the state of said element in the manner of a cryotron.

21. In a superconductive circuit, a support having a superconducting plane thereon, first and second inductively coupled paths provided on said ground plane as first and second superconductive strips disposed one over the other and insulated from each other and from said ground plane, at least one of said strips including an element which is controllably switchable between superconducting and resistive states, means for applying current to said strips so that the strips represent a pair of complementary binary propositions, the state of each proposition being determined by the presence or absence of current flowing in its respective path, and a control strip orthogonally provided with respect to said element and insulated therefrom and from said strips and said ground plane and constructed and arranged to permit control of the state of said element in the manner of a crossed-film cryotron.

22. In a superconductive circuit, a support having a superconducting plane thereon, first and second inductively coupled paths provided on said ground plane as first and second superconductive strips disposed one over the other and insulated from each other and from said ground plane, at least one of said strips including an element which is controllably switchable between superconducting and resistive states, means for applying current to said strips so that the strips represent a pair of complementary binary propositions, the state of each proposition being determined by the presence or absence of current flowing in its respective path, and a control strip provided in parallel with said element and insulated therefrom and from said strips and said ground plane and constructed and arranged to permit control of the state of said element in the manner of an in-line cryotron.

23. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth strips form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane, at least one of said strips at said junction including an element of material which is controllably switchable between superconducting and resistive states.

24. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth strips form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane, at least two of said strips at said junction including an element of material which is controllably switchable between superconducting and resistive states.

25. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth strips form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane, said paths being constructed and arranged such that the paths of one coupled pair orthogonally intersect the paths of the other coupled pair at said junction, a path of said first coupled pair at said junction including an element of material which is controllably switchable between superconducting and resistive states, and a path of said second coupled pair at said junction which is located over said element being provided with a smaller cross-section relative thereto so as to cooperate therewith to cause the state of said element to be responsive to current flow therein in the manner of a crossed-film cryotron.

26. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth strips form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane, said paths being constructed and arranged such that the paths of one coupled pair run parallel to the paths of the other coupled pair at said junction, a path of said first coupled pair at said junction including an element of material which is controllably switchable between superconducting and resistive states, and a path of said second coupled pair at said junction being located over said element so as to cooperate therewith to cause the state of said element to be responsive to current flow therein in the manner of an in-line cryotron.

27. In a superconductive circuit, a support, a film of superconductive material deposited thereon and serving as a superconducting ground plane, first and second parallel paths provided one over the other on said ground plane and insulated from one another and from said ground plane, third and fourth parallel paths provided one over the other on said ground plane and insulated from one another and from said ground plane, and means for applying current to said first and second paths and to said third and fourth paths so that said first and second paths form a first coupled pair representing a first pair of complementary binary logical propositions and said third and fourth strips form a second coupled pair representing a second pair of complementary binary logical propositions, said first and second coupled pairs being constructed and arranged to meet at a junction at which the four paths forming said first and second coupled pairs are provided one over the other and electrically insulated from one another and from said ground plane, said paths being constructed and arranged such that the paths of said first coupled pair at said junction are located between the paths of said second coupled pair at said junction, each path of said first coupled pair at said junction containing an element which is controllably switchable between superconducting and resistive states, and at least one bias path being provided at said junction which cooperates with the upper path of said second coupled pair to control said elements so as to permit the transfer of the current condition of said second coupled pair to said first coupled pair.

References Cited

UNITED STATES PATENTS

| | | | |
|---|---|---|---|
| 3,115,612 | 12/1963 | Meissner | 307—88.5 |
| 3,196,282 | 7/1965 | Ittner | 307—88.5 |
| 3,196,408 | 7/1965 | Brennemann et al. | 307—88.5 |
| 3,207,921 | 9/1965 | Ahrons | 307—88.5 |
| 3,209,172 | 9/1965 | Young | 307—88.5 |

OTHER REFERENCES

"Laminated Gate" by Ames, Brennemann and Caswell, IBM Technical Disclosure bulletin, vol. 5, No. 11, April 1963.

ARTHUR GAUSS, *Primary Examiner.*

R. H. EPSTEIN, S. D. MILLER, *Assistant Examiners.*